United States Patent
Holland et al.

[11] Patent Number: 5,957,498
[45] Date of Patent: Sep. 28, 1999

[54] STEERING COLUMN SUPPORT SYSTEM

[75] Inventors: Joseph P. Holland, Dearborn Heights; John Schambre, Canton; Michael D. Tesauro, Wixom; Chris R. Connolly, Highland; Liliana Neag, Commerce Township; Raymond C. Deyonker, Wixom, all of Mich.

[73] Assignee: Chrysler Corporation, Auburn Hills, Mich.

[21] Appl. No.: 08/946,025

[22] Filed: Oct. 7, 1997

[51] Int. Cl.[6] .............................. B62D 1/16; B60K 37/00
[52] U.S. Cl. ............................................. 280/779; 180/90
[58] Field of Search .................................... 280/779, 777; 180/90; 296/70; 74/493

[56] References Cited

U.S. PATENT DOCUMENTS

| | | | |
|---|---|---|---|
| 1,485,922 | 3/1924 | Higgins | 74/493 |
| 3,580,101 | 5/1971 | Jorgensen | 74/493 |
| 4,738,469 | 4/1988 | Ushijima et al. | 280/777 |
| 5,181,435 | 1/1993 | Khalifa | 74/493 |
| 5,311,960 | 5/1994 | Kukainis et al. | 180/90 |

*Primary Examiner*—Lanna Mai
*Assistant Examiner*—Faye M. Fleming
*Attorney, Agent, or Firm*—Lawrence J. Shurupoff

[57] ABSTRACT

A steering column support structure for an automotive vehicle comprising a plastic instrument panel including duct structure having rear reinforcing ribs and front reinforcing ribs. Upper metal struts are secured to the rear reinforcing ribs. Lower metal struts are secured to the rear reinforcing ribs. The rear ends of the upper and lower struts are secured together. The front ends of the upper and lower struts are rigidly secured to vehicle support structure. The lower struts are secured to the steering column.

10 Claims, 5 Drawing Sheets

STEERING COLUMN SUPPORT SYSTEM

FIELD OF INVENTION

This invention relates generally to a steering column support system for an automotive vehicle.

BACKGROUND AND SUMMARY OF THE INVENTION

The traditional steering column support system consists of a support bracket which typically is a multi-piece steel stamping weldment assembly or a magnesium or aluminum casting coupled with one or more steel stampings or smaller castings.

The steering column support system of this invention has two basic components. One is a plastic instrument panel preferably formed with panel air and demist air ducts. The other consists of one or more lightweight metal, preferably steel, struts. The components work together to exceed the strength and reliability and frequency response requirements of steering column support systems now in use at a considerable reduction in cost.

Further in accordance with the invention, the duct structure of the instrument panel has external reinforcing ribs, and the struts are secured both to the duct structure and to rigid vehicle support structure.

Preferably, the duct structure of the instrument panel has both front and rear reinforcing ribs and upper and lower metal struts. The rear ends of the struts are secured together and the front ends are secured to rigid vehicle support structure. The upper struts are preferably secured to selected ribs on the rear of the duct structure of the instrument panel, and the lower struts are preferably secured to selected ribs on the front of the duct structure.

The air ducts and reinforcing ribs provide both lateral and vertical stability. The lower metal struts are designed with a stress riser to control steering column rise upon frontal impact.

One object of this invention is to provide a steering column support system having the foregoing features and capabilities.

Another object is to provide a steering column support system which is composed of a relatively few simple parts, is rugged and durable in use, and is capable of being relatively inexpensively manufactured and assembled.

These and other objects, features and advantages of the invention will become more apparent as the following description proceeds, especially when considered with the accompanying drawings.

DETAILED DESCRIPTION OF THE PREFERRED EMBODIMENT

Figure 5:
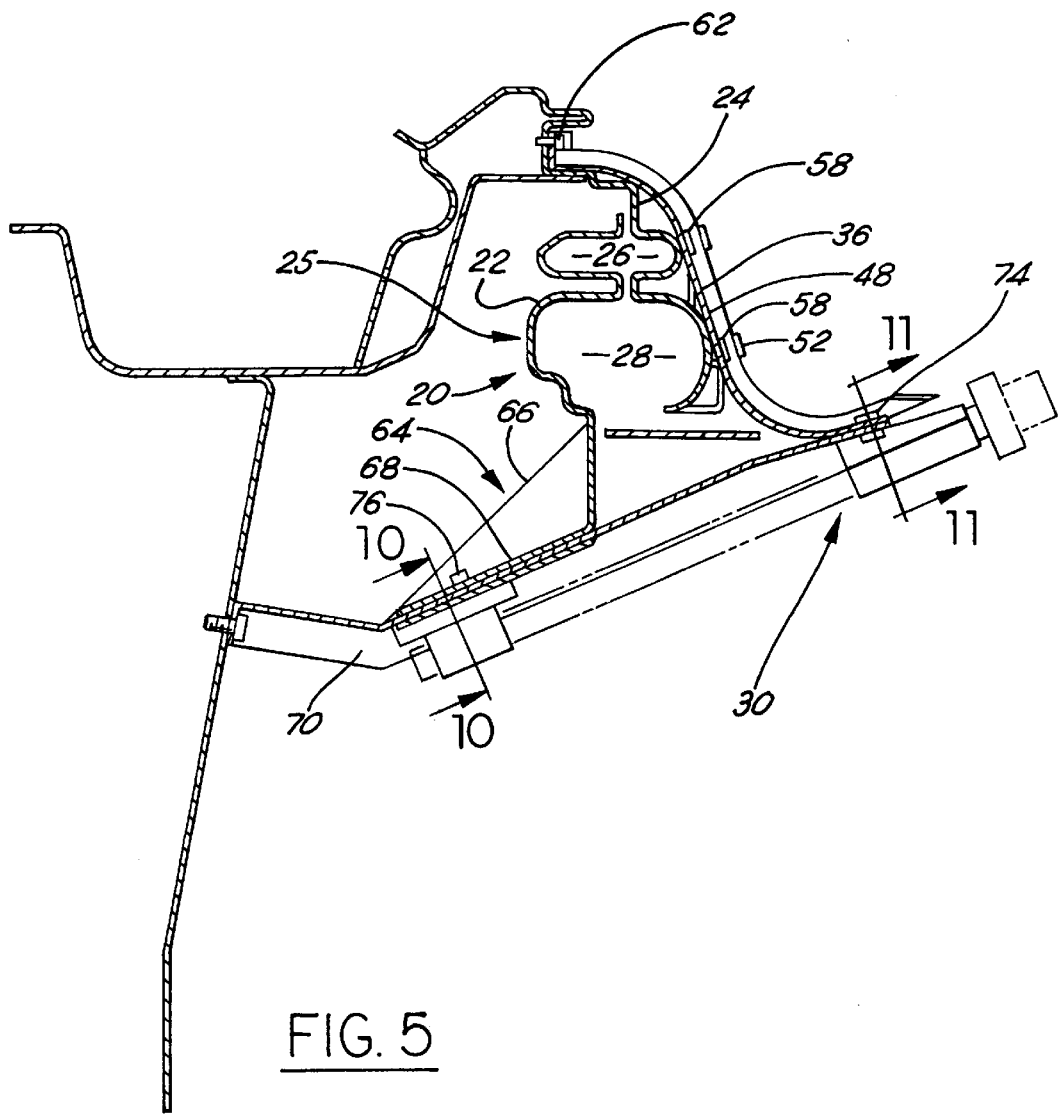
FIG. 5 is a sectional view taken on the line 5—5 in FIG. 2.
Figure 6:
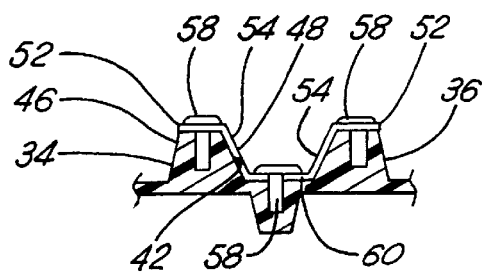
FIG. 6 is a sectional view taken on the line 6—6 in FIG. 2.

Referring now more particularly to the drawings, a plastic instrument panel 20 is shown having front and rear panels 22 and 24 defining duct structure 25 including air duct and demist air passages 26 and 28 (FIG. 5). The front and rear panels 22 and 24 may be separately formed and integrally secured together. The instrument panel is adapted to be secured inside the vehicle to suitable rigid vehicle support structure. The instrument panel is made of a suitable thermoplastic material, preferably a mixture of acrylonitrilebutadiene-styrene (ABS) and polycarbonate. A steering column 30 extends lengthwise of the vehicle beneath the instrument panel with a downward and forward tilt.

Figure 1:
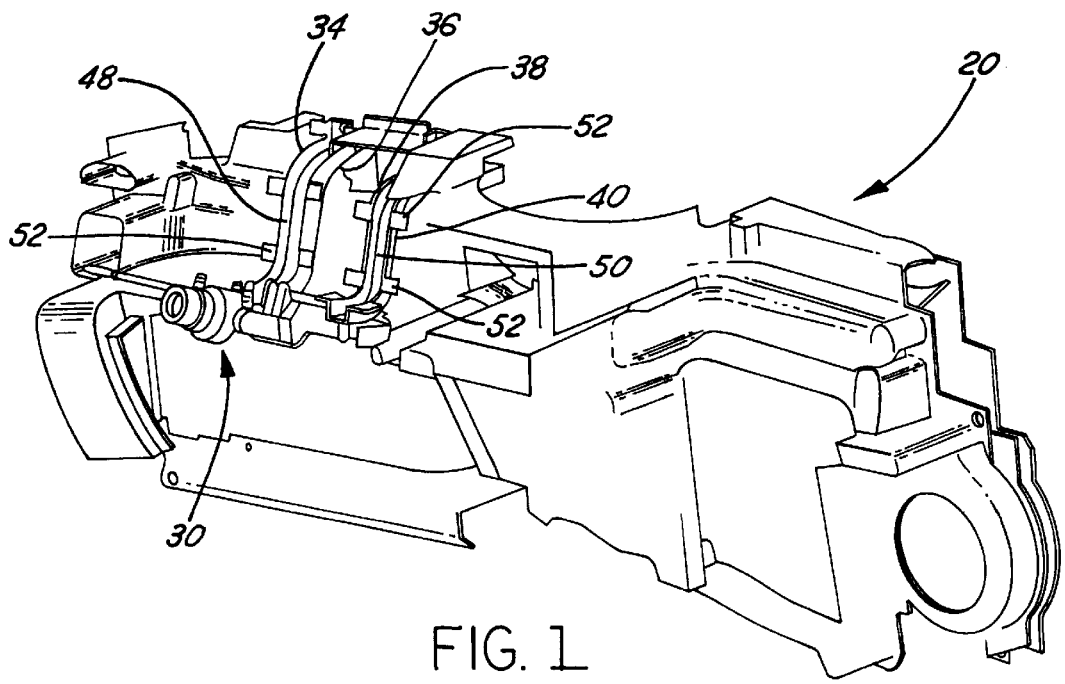
FIG. 1 is a perspective view of a steering column support system embodying the invention as viewed from the rear, having integral reinforcing ribs on the plastic instrument panel duct structure and also having metal struts cooperating in the support of a steering column.
Figure 2:
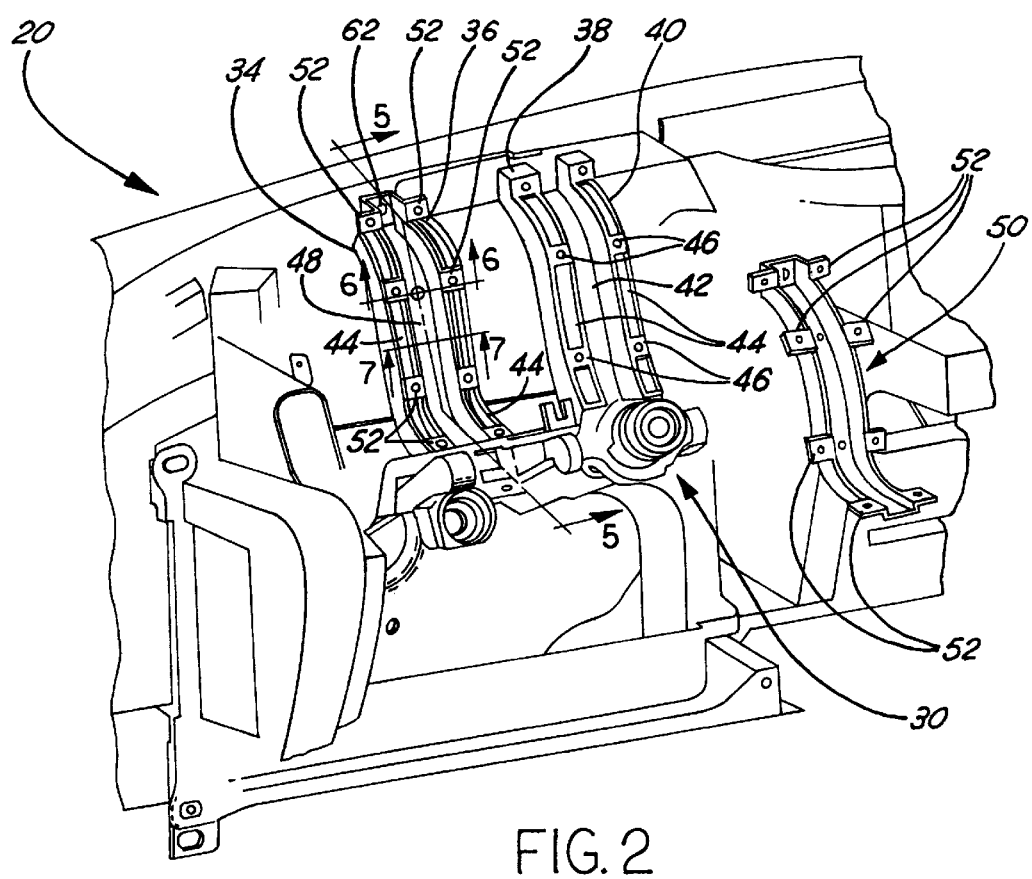
FIG. 2 is a fragmentary perspective view of the structure shown in FIG. 1, as seen from a different angle, and with one of the metal struts separated from the reinforcing ribs to which it is normally attached, for purposes of clarity.
Figure 3:
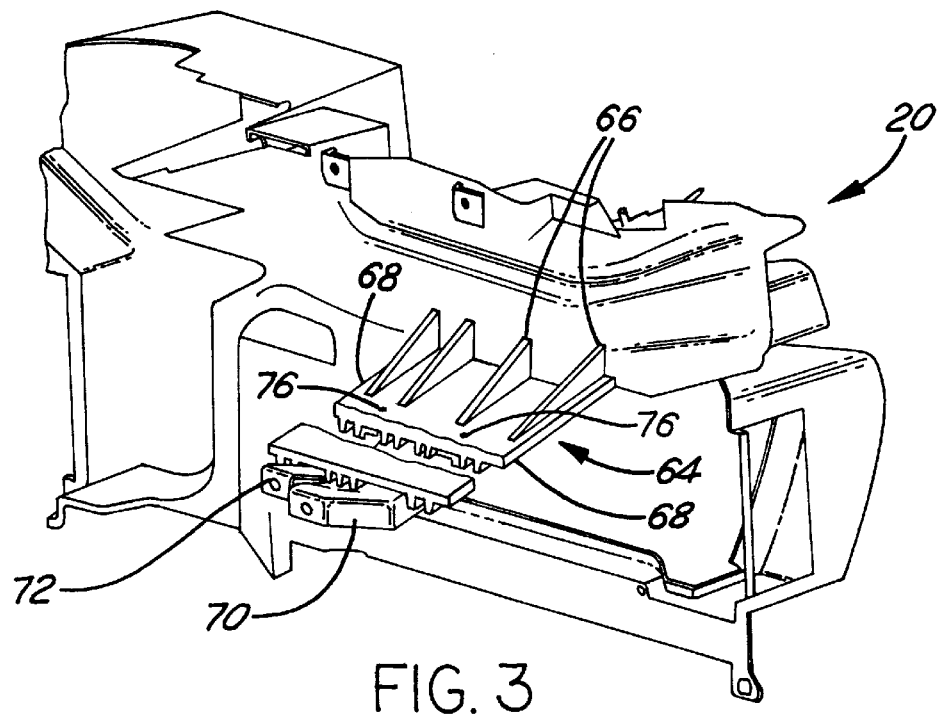
FIG. 3 is a fragmentary perspective view of the instrument panel as viewed from the front.
Figure 7:
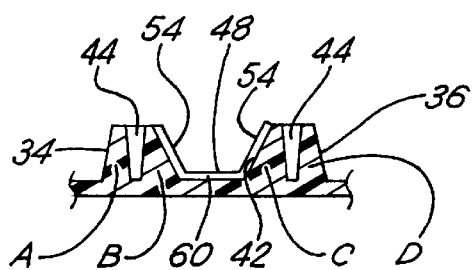
FIG. 7 is a sectional view taken on the line 7—7 in FIG. 2.
Figure 9:
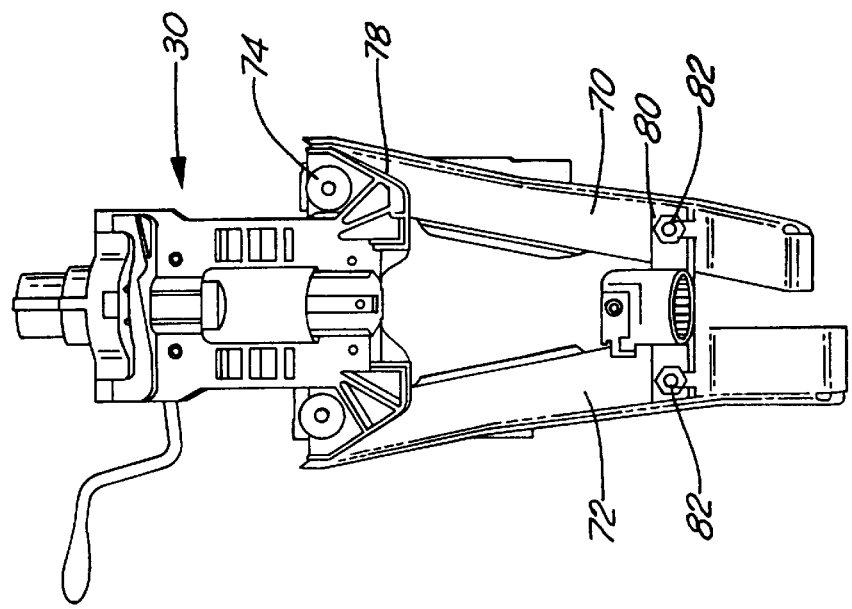
FIG. 9 is a view looking in the direction of the arrow 9 in FIG. 8.
Figure 8:
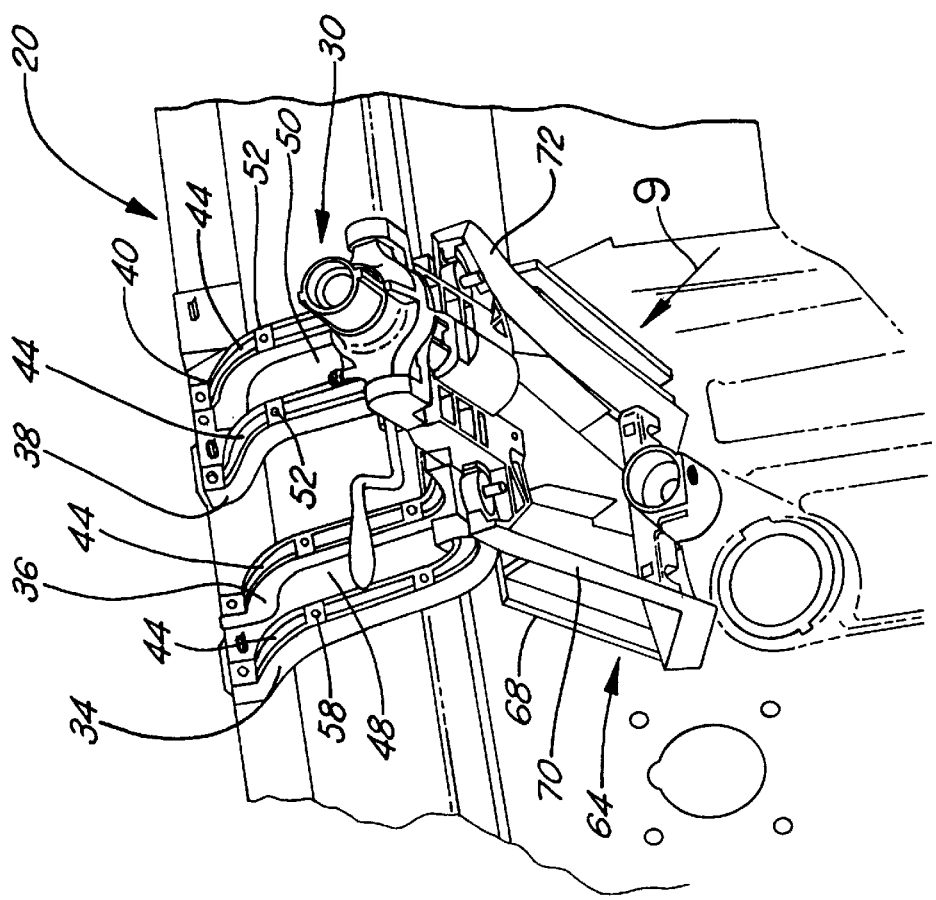
FIG. 8 is a perspective view of the structure shown in FIG. 2 but as seen from a different angle.
Figure 10:
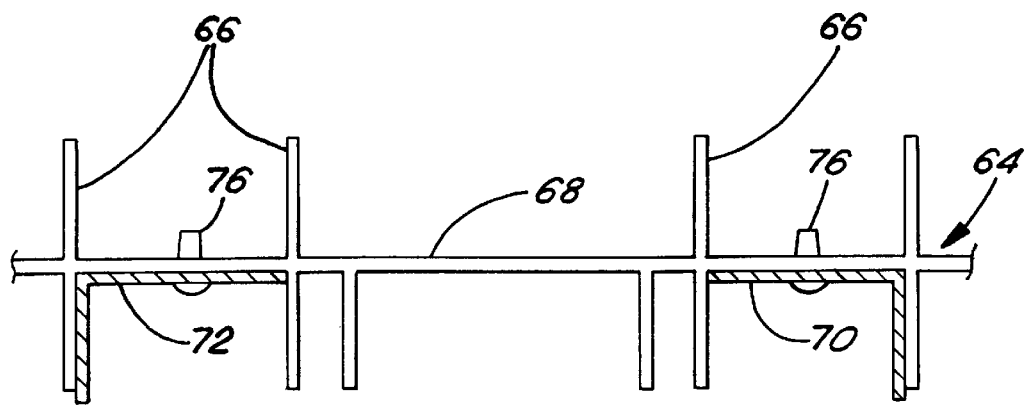
FIG. 10 is a sectional view taken on the line 10—10 in FIG. 5.
Figure 11:
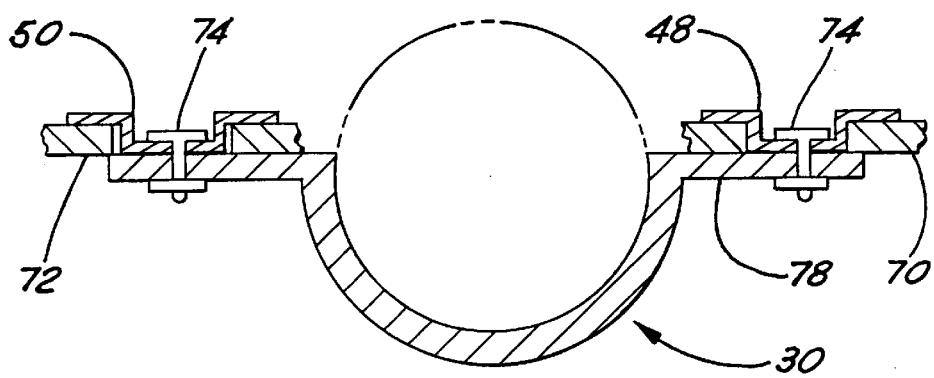
FIG. 11 is a sectional view taken on the line 11—11 in to FIG. 5.

The rear panel 24 of the instrument panel duct structure has four laterally spaced integral rear reinforcing paired rib sets 34, 36, 38 and 40 (FIGS. 1, 2, 6, 7 and 8). The ribs are disposed in vertical planes and curve from their upper ends at the top of the instrument panel downwardly and rearwardly. The paired rib set 34, 36 and 38, 40 are each comprised of two laterally spaced paired ribs A, B and C, D (FIG. 7). The rib sets 38 and 40 are best seen in FIG. 2 where one of the struts, later described, is removed. The ribs of each pair define a channel 42 therebetween, with a groove 44 between the ribs A, B and C, D and mounting blocks 46 at longitudinally spaced points extending across the groove 44.

Figure 4:
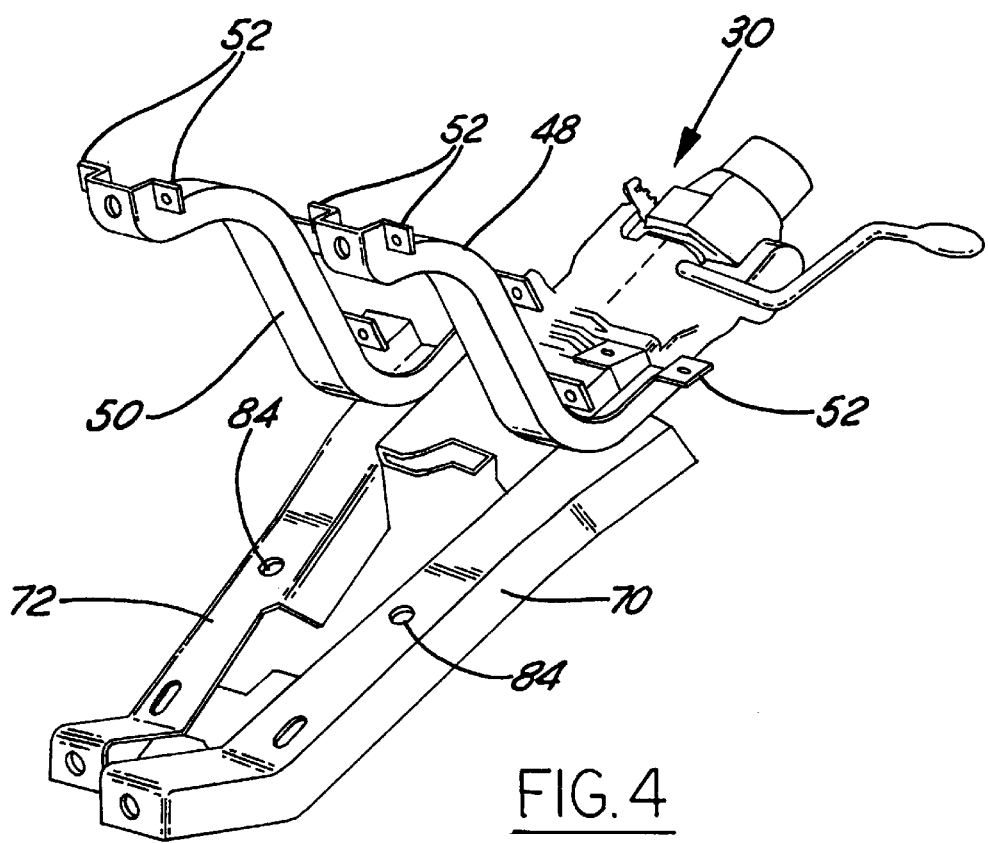
FIG. 4 is a perspective view of the metal struts and the steering column.

Two elongated upper metal struts 48 and 50, preferably made of steel, are provided, one for each pair of ribs (FIGS. 2 and 4). Each strut 48,50 is generally U-shaped in cross-section. One strut 48 extends lengthwise of and nests within the channel 42 between the paired rib sets 34 and 36 and the other strut 50 extends lengthwise of and nests within the channel 42 between the other paired rib sets 38 and 40. Integral tabs 52 extend laterally outwardly from the tops of the side walls 54 of the struts and overlie the mounting blocks 46. Suitable fasteners 58 attach the tabs to the mounting blocks and the base 60 of the struts to the duct structure (See FIG. 6). The upper ends of the struts 48 and 50 are secured to rigid vehicle support structure by fasteners 62.

Integral with the front panel 22 of the instrument panel duct structure is a front reinforcing rib assembly 64. The rib assembly 64 comprises a plurality of laterally spaced reinforcing ribs 66 which are disposed in laterally spaced vertical planes. The rib assembly 64 also includes a reinforcing plate 68 to which the ribs 66 are integrally secured. The ribs 66 and panel 68 are integrally formed with the front panel 22 of the instrument panel.

Two elongated lower metal struts 70 and 72, preferably made of steel, are provided. Each lower strut 70,72 forms a right angle in cross section and extends from its rear end forwardly and downwardly. The rear ends of the lower struts 70,72 are rigidly secured to the rear ends of the upper struts 48,50 fasteners 74. The front ends of the lower struts 70,72 are rigidly secured to a wall of the vehicle support structure by fasteners 75. The lower struts are also secured to the plate 68 of the reinforcing rib assembly 64 by fasteners 76.

The steering column 30 has a rear transversely extending mounting bracket 78, the ends of which are secured to the rear ends of the metal struts 48,50, 70 and 72 by additional fasteners or by the same fasteners 74 which secure the rear ends of the metal struts to one another. The steering column 30 also has a front transversely extending mounting bracket 80, the ends of which are secured to the lower struts 70 and 72 by fasteners 82 extending through openings 84 in the lower struts.

Thus, the steering column 30 is securely held by the co-action of the rib-reinforced, plastic structural duct assembly of the instrument panel and by the metal struts, completely eliminating the traditional support bracket.

What is claimed is:

1. A steering column support system for an automotive vehicle comprising
    a plastic instrument panel having plastic reinforcing ribs,
    metal struts,
    means securing said struts to said instrument panel,
    means for securing said struts to rigid vehicle support structure, and
    means for securing said struts to a steering column.

2. A steering column support system as defined in claim 1, wherein said struts are respectively secured to selected reinforcing ribs on said instrument panel.

3. A steering column support structure for an automotive vehicle comprising
    a plastic instrument panel having a front and a rear and formed with integral laterally spaced reinforcing ribs on the front and integral, laterally spaced reinforcing ribs on the rear,
    elongated, laterally spaced, metal first and second upper struts each having front and rear ends,
    elongated, laterally spaced, metal first and second lower struts each having front and rear ends,
    means securing the rear ends of the first upper and lower struts together,
    means securing the rear ends of the second upper and lower struts together,
    means securing said upper struts to selected ribs on the rear of said instrument panel,
    means securing said lower struts to selected ribs on the front of said instrument panel,
    means for securing the front ends of the first and second upper and lower struts to rigid vehicle support structure, and
    means for securing said lower struts to a steering column.

4. A steering column support structure for an automotive vehicle comprising
    a plastic instrument panel including duct structure having a front and a rear,
    said instrument panel duct structure having on the rear thereof a first pair of integral laterally spaced rear reinforcing ribs and a second pair of integral laterally spaced rear reinforcing ribs laterally spaced from the first pair,
    each pair of rear reinforcing ribs defining a channel therebetween,
    said instrument panel duct structure having a plurality of integral laterally spaced front reinforcing ribs on the front thereof,
    elongated, laterally spaced, metal first and second upper struts having front and rear ends and disposed in said respective channels,
    means securing the first and second upper struts to the ribs of the respective first and second pair of reinforcing ribs,
    elongated, laterally spaced, metal first and second lower struts having front and rear ends,
    means securing said lower struts to selected front reinforcing ribs on said instrument panel,
    means securing the rear ends of the first upper and lower struts together,
    means securing the rear ends of the second upper and lower struts together,
    means for securing the front ends of the upper and lower struts to rigid vehicle support structure, and
    means for securing said lower struts to a steering column.

5. A steering column support assembly as defined in claim 4, wherein said instrument panel is made of a thermoplastic material.

6. A steering column support assembly as defined in claim 4, wherein said upper struts extend above said instrument panel duct structure, and said lower struts extend beneath said instrument panel duct structure.

7. A steering column support assembly as defined in claim 6, wherein said upper struts are generally U-shaped in cross section and nest within said channels, said upper struts are secured to the respective first and second pair of reinforcing ribs by means including tabs, and said upper struts have side walls from which said tabs project laterally outwardly.

8. A steering column support assembly as defined in claim 4, wherein said front reinforcing ribs are integrally connected to a reinforcing plate, said front reinforcing ribs and said reinforcing plate forming a front reinforcing rib assembly integral with said duct structure of the instrument panel, and the means securing said lower struts to selected front reinforcing ribs comprises fasteners connecting said lower struts to said reinforcing plate.

9. A steering column support assembly as defined in claim 8, wherein said upper struts are generally U-shaped in cross section and nest within said channels, said upper struts are secured to the respective first and second pair of reinforcing ribs by means including tabs, and said upper struts have side walls from which said tabs project laterally outwardly.

10. A steering column support assembly as defined in claim 9, wherein said instrument panel is made of a thermoplastic material, and the struts are made of steel.

* * * * *